US010558655B2

(12) United States Patent
He

(10) Patent No.: US 10,558,655 B2
(45) Date of Patent: Feb. 11, 2020

(54) DATA QUERY METHOD SUPPORTING NATURAL LANGUAGE, OPEN PLATFORM, AND USER TERMINAL

(71) Applicant: Huawei Technologies Co., Ltd., Shenzhen (CN)

(72) Inventor: Shan He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 15/387,767

(22) Filed: Dec. 22, 2016

(65) Prior Publication Data

US 2017/0103070 A1    Apr. 13, 2017

Related U.S. Application Data

(63) Continuation of application No. PCT/CN2015/082157, filed on Jun. 24, 2015.

(30) Foreign Application Priority Data

Jun. 24, 2014 (CN) .......................... 2014 1 0289468

(51) Int. Cl.
    G06F 16/2452   (2019.01)
(52) U.S. Cl.
    CPC .............................. G06F 16/24522 (2019.01)
(58) Field of Classification Search
    CPC .................................................. G06F 16/24522
    USPC ........................................................ 707/739
    See application file for complete search history.

(56) References Cited

U.S. PATENT DOCUMENTS

| 2007/0106497 | A1* | 5/2007 | Ramsey ................ G06F 17/278 704/9 |
| 2008/0065607 | A1 | 3/2008 | Weber |
| 2009/0112845 | A1 | 4/2009 | Byers et al. |
| 2012/0016678 | A1 | 1/2012 | Gruber et al. |
| 2014/0188835 | A1* | 7/2014 | Zhang ................. G06F 17/2705 707/706 |

FOREIGN PATENT DOCUMENTS

| CN | 101458688 A | 6/2009 |
| CN | 102737049 A | 10/2012 |
| CN | 103218463 A | 7/2013 |
| CN | 103425714 A | 12/2013 |
| CN | 103455567 A | 12/2013 |
| CN | 103761261 A | 4/2014 |

* cited by examiner

Primary Examiner — Joshua Bullock
(74) Attorney, Agent, or Firm — Slater Matsil, LLP

(57) ABSTRACT

A data query method supporting a natural language, an open platform, and a user terminal are provided, where the method includes: receiving, by the open platform, a natural language query statement sent by the user terminal, and transforming the natural language query statement into a query statement that is recognizable by a third-party content provider; sending, by the open platform, the query statement that is recognizable to one or more third-party content providers; receiving, by the open platform, one or more query response messages returned by the one or more third-party content providers according to the query statement that is recognizable; and sending, by the open platform, the one or more query response messages to the user terminal. A difficulty in accessing the open platform by the third-party content provider can be reduced.

19 Claims, 6 Drawing Sheets

DATA QUERY METHOD SUPPORTING NATURAL LANGUAGE, OPEN PLATFORM, AND USER TERMINAL

CROSS-REFERENCE TO RELATED APPLICATIONS

This application is a continuation of International Application No. PCT/CN2015/082157, filed on Jun. 24, 2015, which claims priority to Chinese Patent Application No. 201410289468.7, filed on Jun. 24, 2014. The disclosures of the aforementioned applications are hereby incorporated by reference in their entireties.

TECHNICAL FIELD

Embodiments of the present invention relate to communications technologies, and in particular, to a data query method supporting a natural language, an open platform, and a user terminal.

BACKGROUND

In an Internet era, a service provided by a third-party content provider is encapsulated into a series of data interfaces that can be easily recognized by a computer, and the data interfaces are opened for use by a developer. This behavior is referred to as an open application programming interface (API), and a platform that provides the open API is referred to as an open platform. By using the open platform, the third-party content provider can not only provide simple access to a Web web page, but also perform complex data interaction.

A current open platform generally provides only openness of data; for a large quantity of existing query requests described by a user in a natural language, a content source needs to be prepared in advance, or a specific third-party content provider needs to be invoked according to a fixed API, so that a third-party content provider that supports a natural language query determines, according to a query statement described in a natural language, a service that can be provided in a content source prepared in advance by the third-party content provider, and sends a query response message to the open platform.

In the prior art, there is a small quantity of third-party content providers that support a natural language query; therefore, compatibility between an open platform and a third-party content provider is not high, and in addition, when performing a natural language query based on the open platform, a user cannot appoint a third-party content provider according to a will of the user, which leads to relatively poor user experience.

SUMMARY

Embodiments of the present invention provide a data query method supporting a natural language, an open platform, and a user terminal, to support a natural language query and improve compatibility between the open platform and a third-party content provider.

According to a first aspect, an embodiment of the present invention provides a data query method supporting a natural language, including receiving, by an open platform, a natural language query statement sent by a user terminal, and transforming the natural language query statement into a query statement that is recognizable by a third-party content provider. The natural language query statement is generated after the user terminal receives a query request described by a user in the natural language. The method further includes sending, by the open platform, the query statement that is recognizable to one or more third-party content providers; and receiving, by the open platform, one or more query response messages returned by the one or more third-party content providers according to the query statement that is recognizable. The method further includes sending, by the open platform, the one or more query response messages to the user terminal.

With reference to the first aspect, in a first possible implementation manner of the first aspect, the one or more third-party content providers are third-party content providers that successfully register with the open platform.

With reference to the first aspect or the first possible implementation manner of the first aspect, in a second possible implementation manner of the first aspect, before the sending, by the open platform, the query statement that can be recognized to one or more third-party content providers, the method further includes: determining, by the open platform, one or more third-party content providers that the user pays attention to; and the sending, by the open platform, the query statement that can be recognized to one or more third-party content providers includes: sending, by the open platform, the query statement that can be recognized to the one or more third-party content providers that the user pays attention to.

With reference to the second possible implementation manner of the first aspect, in a third possible implementation manner of the first aspect, the determining, by the open platform, one or more third-party content providers that the user pays attention to includes: sending, by the open platform to the user terminal, a first message used to indicate a third-party content provider that has successfully registered with the open platform, so that the user terminal displays, according to the first message, a list of the third-party content provider that has successfully registered with the open platform; receiving a second message that is sent by the user terminal and that is used to indicate a third-party content provider that the user chooses to pay attention to; and determining, according to the second message, the one or more third-party content providers that the user pays attention to, where the second message is generated by the user terminal according to a choosing operation performed on the list of the third-party content provider by the user.

With reference to the second possible implementation manner of the first aspect, in a fourth possible implementation manner of the first aspect, the natural language query statement includes the one or more third-party content providers that the user pays attention to, and the determining, by the open platform, one or more third-party content providers that the user pays attention to includes: performing, by the open platform, semantic analysis on the natural language query statement, to determine the one or more third-party content providers that the user pays attention to.

With reference to any one of the first aspect, or the first to the fourth possible implementation manners of the first aspect, in a fifth possible implementation manner of the first aspect, the transforming, by an open platform, the natural language query statement into a query statement that can be recognized by a third-party content provider includes: performing, by the open platform, semantic analysis on the natural language query statement, to determine a third-party content provider type corresponding to the natural language query statement; and transforming, by the open platform according to the third-party content provider type corresponding to the natural language query statement, the natural language query statement into a query statement that can be recognized by a third-party content provider belonging to the third-party content provider type; and the sending, by the open platform, the query statement that can be recognized to one or more third-party content providers includes: sending, by the open platform to one or more third-party content providers belonging to the third-party content provider type, the query statement that can be recognized by the third-party content provider belonging to the third-party content provider type.

With reference to any one of the first aspect, or the first to the fifth possible implementation manners of the first aspect, in a sixth possible implementation manner of the first aspect, when the open platform receives multiple query response messages returned by multiple third-party content providers, sending, by the open platform, the multiple query response messages to the user terminal includes: sending, by the open platform, the multiple query response messages to the user terminal according to a scheduling policy.

With reference to the sixth possible implementation manner of the first aspect, in a seventh possible implementation manner of the first aspect, the sending, by the open platform, the multiple query response messages to the user terminal according to a scheduling policy includes: sending, by the open platform, the multiple query response messages to the user terminal according to bidding ranks of the multiple third-party content providers.

With reference to the sixth possible implementation manner of the first aspect, in an eighth possible implementation manner of the first aspect, the sending, by the open platform, the multiple query response messages to the user terminal according to a scheduling policy includes: determining, by the open platform, a matching degree between a query response message returned by each of the third-party content providers and the natural language query statement; and sending, by the open platform, the multiple query response messages to the user terminal in descending order of matching degrees between the multiple query response messages and the natural language query statement; where the matching degree includes at least one of the following: a distance matching degree, a price matching degree, or a product matching degree.

According to a second aspect, an embodiment of the present invention provides a data query method supporting a natural language, including: receiving, by a user terminal, a query request described by a user in the natural language; generating, by the user terminal, a natural language query statement according to the query request described by the user in the natural language. The method further includes sending, by the user terminal, the natural language query statement to an open platform, so that the open platform transforms the natural language query statement into a query statement that is recognizable by a third-party content provider, and sends the query statement that is recognizable to one or more third-party content providers. The method includes receiving, by the user terminal, one or more query response messages that are returned by the one or more third-party content providers and that are sent by the open platform.

With reference to the second aspect, in a first possible implementation manner of the second aspect, before the receiving, by the user terminal, one or more query response messages that are returned by the one or more third-party content providers and that are sent by the open platform, the method further includes: receiving, by the user terminal, a first message that is sent by the open platform and that is used to indicate a third-party content provider that has successfully registered with the open platform; displaying, by the user terminal according to the first message, a list of the third-party content provider that has successfully registered with the open platform; generating, by the user terminal according to a choosing operation performed on the list of the third-party content provider by the user, a second message used to indicate a third-party content provider that the user chooses to pay attention to; and sending, by the user terminal, the second message to the open platform, so that the open platform determines, according to the second message, the third-party content provider that the user pays attention to, and sends the query statement that can be recognized to one or more third-party content providers that the user pays attention to.

According to a third aspect, an embodiment of the present invention provides an open platform, including: a query statement receiving module, configured to: receive a natural language query statement sent by a user terminal, and transform the natural language query statement into a query statement that can be recognized by a third-party content provider, where the natural language query statement is generated after the user terminal receives a query request described by a user in a natural language; a query statement sending module, configured to send the query statement that can be recognized to one or more third-party content providers; a response message receiving module, configured to receive one or more query response messages returned by the one or more third-party content providers according to the query statement that can be recognized; and a response message sending module, configured to send the one or more query response messages to the user terminal.

With reference to the third aspect, in a first possible implementation manner of the third aspect, the open platform further includes: an information determining module, configured to: before the query statement sending module sends the query statement that can be recognized to the one or more third-party content providers, determine one or more third-party content providers that the user pays attention to, where the query statement sending module is specifically configured to send the query statement that can be recognized to the one or more third-party content providers that the user pays attention to.

With reference to the first possible implementation manner of the third aspect, in a second possible implementation manner of the third aspect, the information determining module is specifically configured to: send, to the user terminal, a first message used to indicate a third-party content provider that has successfully registered with the open platform, so that the user terminal displays, according to the first message, a list of the third-party content provider that has successfully registered with the open platform; receive a second message that is sent by the user terminal and that is used to indicate a third-party content provider that the user chooses to pay attention to; and determine, according to the second message, the one or more third-party content providers that the user pays attention to, where the second message is generated by the user terminal according to a choosing operation performed on the list of the third-party content provider by the user.

With reference to the first possible implementation manner of the third aspect, in a third possible implementation manner of the third aspect, the natural language query statement includes information about the one or more third-party content providers that the user pays attention to, and the information determining module is specifically configured to: perform semantic analysis on the natural language query statement, to determine the one or more third-party content providers that the user pays attention to.

With reference to any one of the third aspect, or the first to the third possible implementation manners of the third aspect, in a fourth possible implementation manner of the third aspect, the query statement receiving module is specifically configured to: perform semantic analysis on the natural language query statement, to determine a third-party content provider type corresponding to the natural language query statement; and transform, according to the third-party content provider type corresponding to the natural language query statement, the natural language query statement into a query statement that can be recognized by a third-party content provider belonging to the third-party content provider type; and the query statement sending module is specifically configured to: send, to one or more third-party content providers belonging to the third-party content provider type, the query statement that can be recognized by the third-party content provider belonging to the third-party content provider type.

With reference to any one of the third aspect, or the first to the fourth possible implementation manners of the third aspect, in a fifth possible implementation manner of the third aspect, in terms of sending a query response message to the user terminal, the response message sending module is specifically configured to: when the response message receiving module receives multiple query response messages returned by multiple third-party content providers, send the multiple query response messages to the user terminal according to a scheduling policy.

With reference to the fifth possible implementation manner of the third aspect, in a sixth possible implementation manner of the third aspect, the response message sending module is specifically configured to send the multiple query response messages to the user terminal according to bidding ranks of the multiple third-party content providers.

With reference to the fifth possible implementation manner of the third aspect, in a seventh possible implementation manner of the third aspect, the response message sending module is specifically configured to: determine a matching degree between a query response message returned by each of the third-party content providers and the natural language query statement; and send, by the open platform, the multiple query response messages to the user terminal in descending order of matching degrees between the multiple query response messages and the natural language query statement; where the matching degree includes at least one of the following: a distance matching degree, a price matching degree, or a product matching degree.

According to a fourth aspect, an embodiment of the present invention provides a user terminal, including: a request receiving module, configured to receive a query request described by a user in a natural language; a statement generation module, configured to generate a natural language query statement according to the query request described by the user in the natural language; a query statement sending module, configured to send the natural language query statement to an open platform, so that the open platform transforms the natural language query statement into a query statement that can be recognized by a third-party content provider, and sends the query statement that can be recognized to the one or more third-party content providers; and a response message receiving module, configured to receive one or more query response messages that are returned by the one or more third-party content providers and that are sent by the open platform.

With reference to the fourth aspect, in a first possible implementation manner of the fourth aspect, the user terminal further includes: an information receiving module, configured to: before the response message receiving module receives the one or more query response messages that are returned by the one or more third-party content providers and that are sent by the open platform, receive a first message that is sent by the open platform and that is used to indicate a third-party content provider that has successfully registered with the open platform; a display module, configured to display, according to the first message, a list of the third-party content provider that has successfully registered with the open platform; an information generation module, configured to generate, according to a choosing operation performed on the list of the third-party content provider by the user, a second message used to indicate a third-party content provider that the user chooses to pay attention to; and an information sending module, configured to send the second message to the open platform, so that the open platform determines, according to the second message, the third-party content provider that the user pays attention to, and sends the query statement that can be recognized to one or more third-party content providers that the user pays attention to.

The embodiments of the present invention provide a data query method supporting a natural language, an open platform, and a user terminal. According to the method, an open platform receives a natural language query statement sent by the user terminal, and transforms the natural language query statement into a query statement that can be recognized by a third-party content provider; sends the query statement that can be recognized to one or more third-party content providers; receives one or more query response messages returned by the one or more third-party content providers according to the query statement that can be recognized; and sends the one or more query response messages to the user terminal. In the embodiments, the open platform transforms the natural language query statement into the query statement that can be recognized by the third-party content provider, and the third-party content provider does not need to have a natural language processing capability; an interface may be directly opened for the third-party content provider to perform integration, which reduces an access difficulty in accessing the open platform by the third-party content provider.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make objectives, technical solutions, and advantages of embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
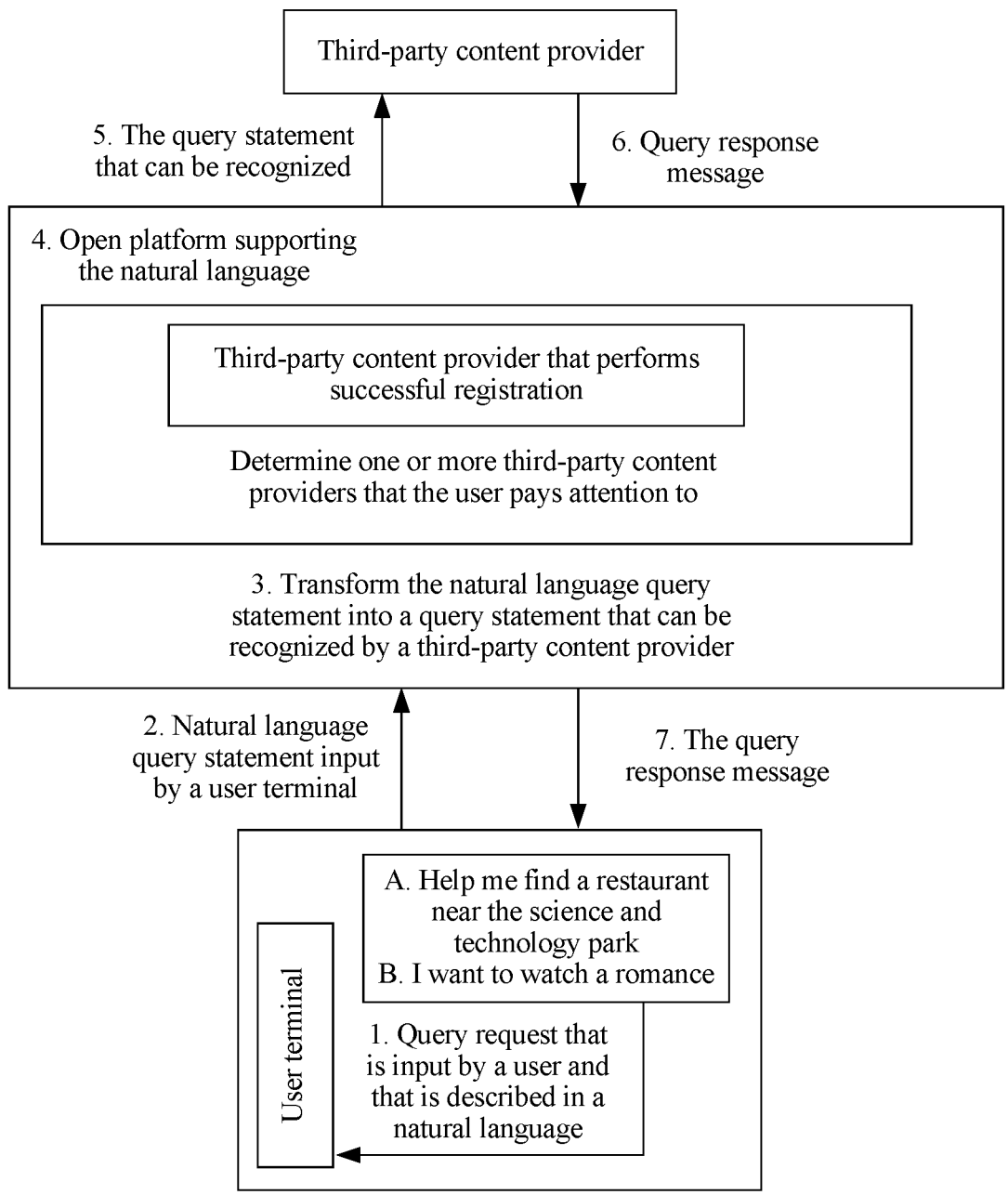
FIG. 1 is a schematic diagram of an application scenario of a data query supporting a natural language according to the present invention.

FIG. 1 is a schematic diagram of an application scenario of a data query supporting a natural language according to the present invention. It should be noted that, the natural language is used relative to a logic language. The logic language is a communication tool used between a human brain and a computer, and the natural language is a communication tool used between human brains. In terms of a form, the natural language generally includes characters (for example, a Chinese character, a phrase, and punctuation) of specific semantics or syntax, or a context. In a specific embodiment, the natural language may be understood as a voice, for example, an utterance that a user says. In a specific implementation process, when the user needs to acquire a service provided by a third-party content provider, the user may input, into a user terminal by using a voice assistant of the user terminal, a query request described in the natural language. The user terminal generates a natural language query statement in a text form from the query request described in the natural language in a voice form, and sends the natural language query statement to an open platform. The open platform sends the natural language query statement that can be recognized to a third-party content provider that performs successful registration. When the third-party content provider returns a query response message to the open platform, the third-party content provider feeds back the query response message to the user terminal, so that the user acquires corresponding service content. A specific process is as follows.

1. The user terminal acquires a query request that is described by the user in the natural language and that is input by using a voice, for example: A. Help me find a restaurant near the science and technology park, or B. I want to watch a romance.

2. The open platform acquires a natural language query statement input by the user terminal.

3. The open platform transforms the natural language query statement into a query statement that can be recognized by a third-party content provider.

4. The open platform determines one or more third-party content providers that the user pays attention to.

5. After determining the one or more third-party content providers that the user pays attention to, the open platform sends the query statement that can be recognized to a corresponding third-party content provider.

6. The open platform receives a query response message returned by the third-party content provider.

7. The open platform returns the query response message to the user terminal.

Persons skilled in the art may understand that, in an embodiment shown in FIG. 1, the open platform may be a computer, a server, or a cluster system integrated with a software algorithm. An application programming interface (API) or a function (function) of the open platform is opened for use by a third-party developer, and the third-party content provider accesses the open platform by using a registration mechanism, and provides a service for the user terminal under scheduling of the open platform. Executors of the third-party content provider may be specifically various network devices of the third-party content provider. A specific type of the network device is not specially limited herein in this embodiment.

Figure 2:
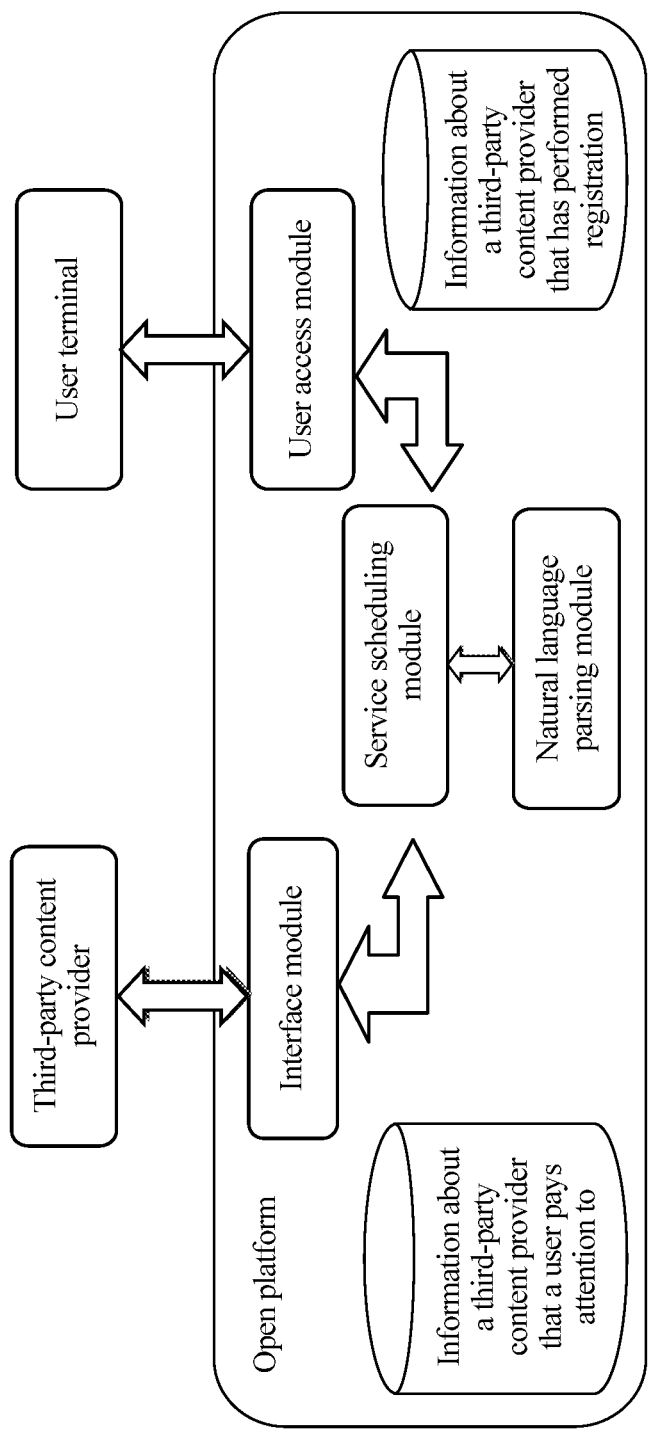
FIG. 2 is a schematic diagram of an architecture of an open platform according to an embodiment of the present invention.

FIG. 2 is a schematic diagram of an architecture of an open platform according to an embodiment of the present invention. The open platform provided in this embodiment may be applied to the application scenario shown in the embodiment in FIG. 1. The open platform provided in this embodiment includes: a user access module, responsible for inputting, into the open platform, a natural language query statement sent by a user terminal, and returning a query response message to the user terminal; an interface module, configured to: interconnect with a third-party content provider by using an open API, send a query statement that can be recognized to the third-party content provider, and acquire a query response message returned by the third-party content provider; a natural language parsing module, responsible for transforming the natural language query statement into the query statement that can be recognized by the third-party content provider; and a service scheduling module, which is a control module of the open platform and is configured to: send the natural language query statement to the natural language parsing module; send, according to information about a third-party content provider that a user chooses to pay attention to and information about a third-party content provider that performs successful registration, the query statement that can be recognized to the third-party content provider; and return the query response message to the user access module; the information about the third-party content provider that has performed successful registration, where a third-party content provider that has performed successfully registration and accessed the open platform is saved, and the information may be implemented in a list manner; and the information about the third-party content provider that the user pays attention to, where the user chooses, by using the user terminal, the third-party content provider that the user pays attention to, the user terminal generates, according to a choosing operation of the user, the information about the third-party content provider that the user pays attention to, and the open platform acquires the information; and the information may be implemented in a list manner.

The following describes in detail, by using a detailed embodiment and with reference to FIG. 1 and FIG. 2, a data query method supporting a natural language on the open platform in this embodiment.

Figure 3:
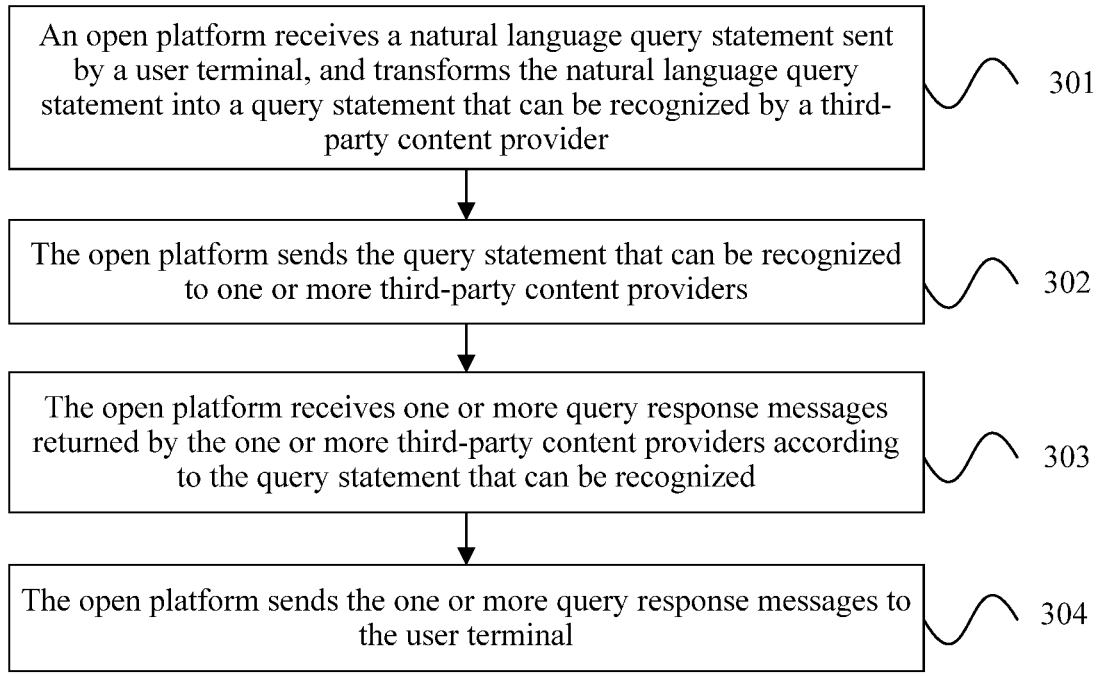
FIG. 3 is a flowchart of Embodiment 1 of a data query method supporting a natural language according to the present invention.

FIG. 3 is a flowchart of Embodiment 1 of a data query method supporting a natural language according to the present invention. This embodiment is executed by an open platform, and the open platform can be run on various servers. The data query method supporting a natural language is implemented by using a processing function of the server. As shown in FIG. 3, the method in this embodiment may include the following steps:

Step 301: An open platform receives a natural language query statement sent by a user terminal, and transforms the natural language query statement into a query statement that can be recognized by a third-party content provider.

The natural language query statement is generated after the user terminal receives a query request described by a user in a natural language.

Step 302: The open platform sends the query statement that can be recognized to one or more third-party content providers.

Step 303: The open platform receives one or more query response messages returned by the one or more third-party content providers according to the query statement that can be recognized.

Step 304: The open platform sends the one or more query response messages to the user terminal.

In a specific application process, a third-party content provider accesses the open platform by using a registration mechanism of the open platform. Specifically, the open platform receives an authentication access request message sent by the third-party content provider, where the authentication access request message includes registration information of the third-party content provider, and the registration information may be, for example, registration information about whether the third-party content provider participates in bidding ranking, or participates in optimal matching. After the third-party content provider passes authentication, that is, the third-party content provider performs successful registration, an authentication access response message is sent to the third-party content provider. In a specific embodiment, after the third-party content provider registers with the open platform and passes authentication, the third-party content provider downloads an access specification and a relevant software development kit (SDK) from the open platform, and then the third-party content provider submits, to the open platform according to the specification, an open API provided by the open platform and used by the third-party content provider. At this time, the third-party content provider can provide a service for the user terminal by using the open platform.

For the user, when the user needs to acquire a corresponding service provided by a third-party content provider, the user inputs a query request described in the natural language into the user terminal by using a voice, for example, "Is there anything good to eat nearby"; then the user terminal transforms, by using a voice recognition function, the query request described in the natural language into a natural language query statement. In step 301, the open platform acquires the natural language query statement "Is there anything good to eat nearby" input by the user terminal. The query request that is described in the natural language and is involved in this embodiment mainly refers to a language daily used by people.

Then, the open platform transforms the natural language query statement "Is there anything good to eat nearby" into a query statement that can be recognized by the third-party content provider. Persons skilled in the art may understand that, the open platform can extract useful information from "Is there anything good to eat nearby". For example, automatic index word extraction, filtering, retrieval, automatic important information extraction, or automatic abstraction is performed on a natural language text. In this embodiment, the query statement that can be recognized refers to a key word or a parameter that has no ambiguity and that can be recognized by the third-party content provider without performing a natural language processing process by the third-party content provider. In a specific implementation process, the natural language query statement may be processed by using a natural language processing method. Specifically, the natural language query statement may be transformed into a key word and a parameter that can be recognized by the third-party content provider. For example, "Is there anything good to eat nearby" is transformed into key words "distance less than 1 kilometer" and "food", so that the third-party content provider does not need to analyze the natural language query statement, and only needs to perform matching processing between the key words "distance less than 1 kilometer" and "food" in the query statement that can be recognized and an existing shop condition, and chooses an appropriate shop. Persons skilled in the art may understand that, the third-party content provider stores key word information of shops and the like; a query response message that needs to be returned to the open platform may be determined according to key word matching, where the query response message may include a shop name, a shop location, a product price, product performance, word of mouth of a product, and the like. When the third-party content provider performs matching according to the key words and the matching fails, the query response message may include information indicating a query failure or information indicating that a service fails to be provided.

In step 302, the open platform sends the query statement that can be recognized to one or more third-party content providers that perform successful registration. Any third-party content provider is used as an example for description. After acquiring the query statement that can be recognized and that is sent by the open platform, the third-party content provider determines a nearby shop that is relevant to food; the third-party content provider returns a query response message corresponding to the query statement that can be recognized to the open platform, where the query response message includes a shop name, a shop location, food introduction, and the like.

In step 303, the open platform receives the one or more query response messages returned by the one or more third-party content providers according to the query statement that can be recognized. Finally, in step 304, the open platform sends the one or more query response messages to the user terminal.

In the data query method supporting a natural language provided in this embodiment of the present invention, an open platform receives a natural language query statement sent by a user terminal, and transforms the natural language query statement into a query statement that can be recognized by a third-party content provider, where the natural language query statement is generated after the user terminal receives a query request described by a user in the natural language; sends the query statement that can be recognized to one or more third-party content providers; receives one or more query response messages returned by the one or more third-party content providers according to the query statement that can be recognized; and sends the one or more query response messages to the user terminal. In this embodiment, the open platform transforms the natural language query statement into the query statement that can be recognized by the third-party content provider, and the third-party content provider does not need to have a natural language processing capability; an interface may be directly opened for the third-party content provider to perform integration, which reduces an access difficulty in accessing the open platform by the third-party content provider.

Optionally, with reference to FIG. 1, before step 302, step 4 in the embodiment in FIG. 1 is further performed, so that the open platform determines a third-party content provider that can recognize the query statement. In a specific implementation process, the open platform determines one or more third-party content providers that the user pays attention to, and the one or more third-party content providers that the user pays attention to are third-party content providers that are determined by the open platform and that can recognize the query statement. The open platform determines, specifically in the following possible implementation manners, the one or more third-party content providers that the user pays attention to.

One possible implementation manner is: the open platform performs semantic analysis on the natural language query statement, to determine the one or more third-party content providers that the user pays attention to.

In a specific implementation manner, the open platform performs semantic analysis on the natural language query statement, and determines whether the natural language query statement includes an identifier of a third-party content provider. If the natural language query statement includes the identifier of the third-party content provider, the open platform may determine, according to the identifier that is of the third-party content provider and that is included in the natural query statement, the one or more third-party content providers that the user pays attention to. A specific embodiment is used as an example for detailed description. The open platform returns, to the user terminal, a third-party content provider that performs successful registration, and the user may pay attention to a third-party content provider in the third-party content provider that performs successful registration. When the open platform acquires the natural language query statement, for example, the acquired natural language query statement is "search a third-party content provider A for a nearby cake shop", the open platform determines, by means of semantic analysis, that the natural language query statement includes the "third-party content provider A", and in this case, the open platform performs matching on the third-party content provider that performs successful registration, and determines whether the natural language query statement includes the "third-party content provider A". In this embodiment, if it is determined that the natural language query statement includes the "third-party content provider A", the open platform sends a query statement that can be recognized to the "third-party content provider A", and acquires a query response message returned by the "third-party content provider A". Persons skilled in the art may understand that, the natural language query statement of the user may include multiple third-party content providers, and in this case, the third-party content providers acquire multiple query response messages. If the natural language query statement does not include a third-party content provider that the user pays attention to, the open platform sends the query statement that can be recognized to all third-party content providers that perform successful registration, and acquires query response messages returned by all the third-party content providers that perform successful registration.

Another possible implementation manner is: the open platform sends, to the user terminal, a first message used to indicate a third-party content provider that has successfully registered with the open platform, so that the user terminal displays, according to the first message, a list of the third-party content provider that has successfully registered with the open platform; receives a second message that is sent by the user terminal and that is used to indicate a third-party content provider that the user chooses to pay attention to; and determines, according to the second message, the one or more third-party content providers that the user pays attention to, where the second message is generated by the user terminal according to a choosing operation performed on the list of the third-party content provider by the user.

In a specific implementation process, the open platform sends the first information to the user terminal, where the first information includes the third-party content provider that performs successful registration. Optionally, the first information may be implemented in a list form, and the list includes an identifier of the third-party content provider that performs successful registration. After acquiring the first information, the user terminal displays, to the user by using a display interface and according to the first information, the list of the third-party content provider that performs successful registration, and the user may choose a third-party content provider that the user prefers from the list of the third-party content provider that performs successful registration. The user terminal generates the second information according to the choosing operation performed on the list of the third-party content provider by the user, where the second information includes an identifier of the third-party content provider that the user pays attention to. Optionally, the second information may be implemented in a list form. For example, the second information includes third-party content providers such as a "third-party content provider A", a "third-party content provider B", and a "third-party content provider C" that the user pays attention to. The open platform may determine, according to the second information, the one or more third-party content providers that the user pays attention to.

In the foregoing two possible implementation manners, accordingly, the open platform sends, according to the one or more third-party content providers that the user pays attention to, the query statement that can be recognized to the one or more third-party content providers that the user pays attention to.

In this embodiment, it is implemented that the user pays attention to the third-party content provider in a self-defining manner, so that the user can voluntarily choose a third-party content provider that the user prefers.

Optionally, based on the foregoing embodiments, that the open platform transforms the natural language query statement into a query statement that can be recognized by a third-party content provider includes: performing, by the open platform, semantic analysis on the natural language query statement to determine a third-party content provider type corresponding to the natural language query statement; and transforming, by the open platform according to the third-party content provider type corresponding to the natural language query statement, the natural language query statement into a query statement that can be recognized by a third-party content provider belonging to the third-party content provider type.

That the open platform sends the query statement that can be recognized to one or more third-party content providers includes:

sending, by the open platform to one or more third-party content providers belonging to the third-party content provider type, the query statement that can be recognized by the third-party content provider belonging to the third-party content provider type.

In a specific implementation process, the open platform performs semantic analysis on the acquired natural language query statement. For example, semantic analysis is performed on "Help me find a restaurant near the science and technology park", and a third-party content provider type is determined as a third-party content provider of a life encyclopedia type. In this case, the open platform transforms the "Help me find a restaurant near the science and technology park" into query statements "food", "restaurant", and "science and technology park" that can be recognized by a third-party content provider belonging to the third-party content provider of the life encyclopedia type, and then sends the query statements "food", "restaurant", and "science and technology park" that can be recognized to one or more third-party content providers that perform successful registration and that belong to the third-party content provider of the life encyclopedia type, and acquires one or more query response messages returned by the third-party content provider of the life encyclopedia type.

For another example, semantic analysis is performed on "I want to watch a romance", and a third-party content provider type is determined as a third-party content provider of a film and television data type. In this case, the open platform transforms the "I want to watch a romance" into query statements "film" and "romance" that can be recognized by a third-party content provider belonging to the third-party content provider of the film and television data type; and then sends the query statements "film" and "romance" that can be recognized to a third-party content provider that performs successful registration and that belongs to the third-party content provider of the film and television data type, and acquires one or more query response messages returned by the third-party content provider of the film and television data type.

In this embodiment of the present invention, semantic analysis is performed on a natural language query statement, and a query statement that can be recognized is sent to a specific third-party content provider, which reduces signaling interaction and improves processing efficiency of an open platform.

Optionally, with reference to FIG. 1, when the open platform sends the query statement that can be recognized to multiple third-party content providers, and acquires multiple query response messages, there is a problem of how to return the multiple query response messages to the user terminal. Therefore, before step 304, that is, before the open platform sends the multiple query response messages to the user terminal, or that is, before step 7 in the scenario embodiment in FIG. 1, the open platform sends the multiple query response messages to the user terminal according to a scheduling policy. Specifically, the open platform determines, according to registration information of the multiple third-party content providers, the scheduling policy according to which the multiple query response messages returned by the multiple third-party content providers are sent to the user terminal. The scheduling policy may include a bidding rank scheduling policy, a matching degree scheduling policy, a word-of-mouth scheduling policy, and the like. A specific scheduling policy is not specially limited herein in this embodiment. When sending the multiple query response messages to the user terminal, the open platform specifically sequences the multiple query response messages according to the scheduling policy, and sends the multiple query response messages to the user terminal according to a sequencing result. The following possible implementation manners may be included.

One possible implementation manner is: the open platform sends the multiple query response messages to the user terminal according to bidding ranks of the multiple third-party content providers.

Specifically, according to registration information about whether the multiple third-party content providers participate in bidding ranking, a bidding rank scheduling policy according to which query response messages returned by third-party content providers that participate in bidding ranking are sent to the user terminal is determined. The multiple query response messages are sequenced according to the bidding rank scheduling policy and bidding ranks of the third-party content providers, and the multiple query response messages are sent to the user terminal according to a sequencing result.

A specific embodiment is used as an example. If the registration information about the multiple third-party content providers includes bidding information of food, that is, key word purchase of food, the open platform sequences the query response messages according to bidding ranks of the third-party content providers, that is, money paid for the purchase, and preferentially sends, to the user terminal, a query response message returned by a third-party content provider that has a high bidding rank. The user terminal preferentially displays a query response message that has a high bidding rank to the user. For example, the open platform sends, to the user terminal according to a sequencing result, three query response messages that have top three bidding ranks, and the user terminal displays only the three query response messages. Alternatively, the open platform sends, to the user terminal according to a sequencing result, the query response messages and priorities of the query response messages, and the user terminal displays the query response messages to the user in order according to the priorities.

Another possible implementation manner is: the open platform determines a matching degree between a query response message returned by each of the third-party content providers and the natural language query statement, and the open platform sends the multiple query response messages to the user terminal in descending order of matching degrees between the multiple query response messages and the natural language query statement.

Specifically, the matching degrees between the query response messages returned by the third-party content providers and the natural language query statement are determined according to registration information about whether the multiple third-party content providers participate in optimal matching. An optimal matching scheduling policy according to which query response messages are sent to the user terminal is determined according to the matching degrees. The multiple query response messages are sequenced according to the optimal matching scheduling policy and in descending order of the matching degrees between the query response messages and the natural language query statement, and the multiple query response messages are sent to the user terminal according to a sequencing result.

The matching degree includes at least one of the following: a distance matching degree, a price matching degree, or a product matching degree.

In the following, a specific embodiment is used as an example for detailed description.

When the matching degree is a distance matching degree, and the registration information of the multiple third-party content providers includes information indicating that the multiple third-party content providers participate in optimal matching and the matching degree is the distance matching degree, the open platform sequences distances between the user terminal and shop locations in returned query response messages, and preferentially sends, to the user terminal, a query response message returned by a third-party content provider that has a shortest distance from the user terminal, and the user terminal preferentially displays the query response message that has the shortest distance. Alternatively, the open platform sends query response messages and priorities of the query response messages to the user terminal according to a sequencing result, and the user terminal displays the query response messages to the user in order according to the priorities.

When the matching degree is a product matching degree, and the registration information of the multiple third-party content providers includes information indicating that the multiple third-party content providers participate in optimal matching and the matching degree is product matching, the open platform extracts key words from returned query response messages, performs matching between the key words and the natural language query statement, and preferentially sends, to the user terminal, a query response message that is returned by a third-party content provider and that has a highest matching degree, and the user terminal preferentially displays the query response message that has the highest matching degree. Alternatively, the open platform sends query response messages and priorities of the query response messages to the user terminal according to a sequencing result, and the user terminal displays the query response messages to the user in order according to the priorities.

When the matching degree is a price matching degree, and the registration information of the multiple third-party content providers includes information indicating that the multiple third-party content providers participate in optimal matching and the matching degree is price matching, the open platform extracts price information from returned query response messages, sequences prices, and preferentially sends, to the user terminal, a query response message returned by a third-party content provider that has a lowest price, and the user terminal preferentially displays the query response message that has a highest matching degree. Alternatively, the open platform sends query response messages and priorities of the query response messages to the user terminal according to a sequencing result, and the user terminal displays the query response messages to the user in order according to the priorities.

In this embodiment of the present invention, an open platform sends a query response message to a user terminal according to a scheduling policy. Therefore, not only an optimal query response result is provided for the user terminal, but also a third-party content provider can improve service quality and improve user experience.

Figure 4:
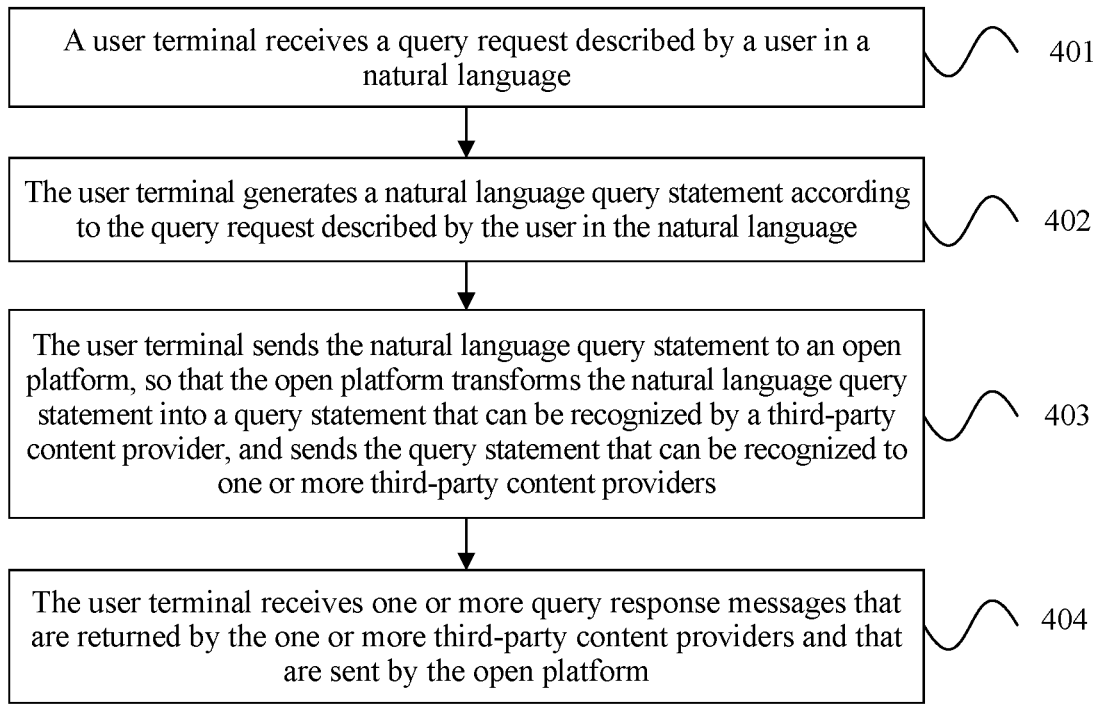
FIG. 4 is a flowchart of Embodiment 2 of a data query method supporting a natural language according to the present invention.

FIG. 4 is a flowchart of Embodiment 2 of a data query method supporting a natural language according to the present invention. This embodiment is executed by a user terminal, and the user terminal may be specifically a smart phone, a tablet computer, or the like. The data query method supporting a natural language provided in this embodiment may be implemented together with a method applied to an open platform side. As shown in FIG. 4, the method in this embodiment may include the following steps:

Step 401: A user terminal receives a query request described by a user in a natural language.

Step 402: The user terminal generates a natural language query statement according to the query request described by the user in the natural language.

Step 403: The user terminal sends the natural language query statement to an open platform, so that the open platform transforms the natural language query statement into a query statement that can be recognized by a third-party content provider, and sends the query statement that can be recognized to one or more third-party content providers.

Step 404: The user terminal receives one or more query response messages that are returned by the one or more third-party content providers and that are sent by the open platform.

An application scenario of this embodiment is shown in the embodiment in FIG. 1, and details are not described herein in this embodiment.

In a specific implementation process, the user terminal receives, by using a tool such as a voice assistant, a query request described in a natural language in a user voice form. The user terminal generates a natural language query statement in a text form from the query request described in the natural language in the user voice form.

Then, the user terminal sends the natural language query statement to the open platform, so that the open platform transforms the natural language query statement into the query statement that can be recognized by the third-party content provider. The open platform sends the query statement that can be recognized to the one or more third-party content providers, and then receives the query response message returned by the one or more third-party content providers.

Then, the user terminal receives the one or more query response messages sent by the open platform. In a specific implementation process, when there are multiple query response messages, the user terminal displays the query response messages on a display interface of the user terminal according to an order of receiving the query response messages sent by the open platform; or the user terminal displays, according to the query response messages and priorities of the query response messages that are sent by the open platform, the query response messages on a display interface in a priority sequence.

Optionally, before the receiving, by the user terminal, one or more query response messages that are returned by the one or more third-party content providers and that are sent by the open platform, the method further includes:

receiving, by the user terminal, a first message that is sent by the open platform and that is used to indicate a third-party content provider that has successfully registered with the open platform;

displaying, by the user terminal according to the first message, a list of the third-party content provider that has successfully registered with the open platform;

generating, by the user terminal according to a choosing operation performed on the list of the third-party content provider by the user, a second message used to indicate a third-party content provider that the user chooses to pay attention to; and sending, by the user terminal, the second message to the open platform, so that the open platform determines, according to the second message, the third-party content provider that the user pays attention to, and sends the query statement that can be recognized to one or more third-party content providers that the user pays attention to.

For a specific implementation manner of this embodiment, reference may be made to the foregoing embodiment, and details are not described herein in this embodiment.

In the data query method supporting a natural language provided in this embodiment of the present invention, an open platform transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider.

Figure 5:
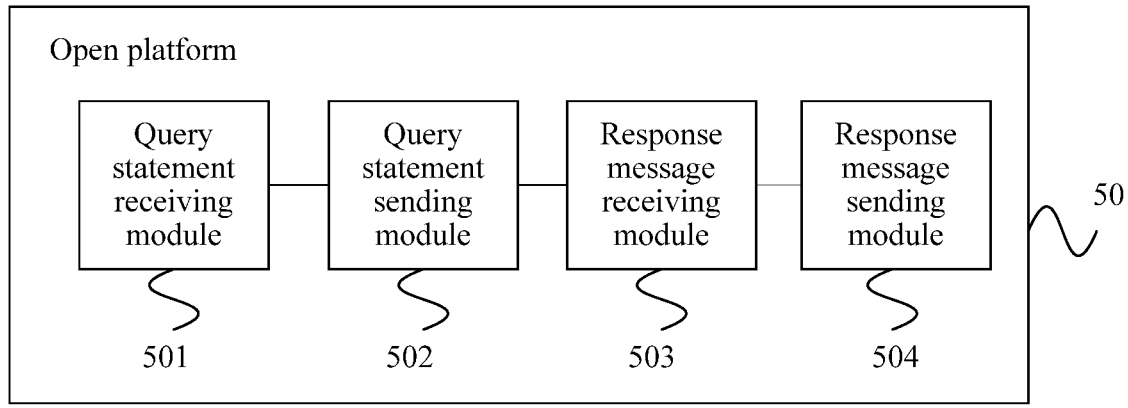
FIG. 5 is a schematic structural diagram of Embodiment 1 of an open platform according to the present invention.

FIG. 5 is a schematic structural diagram of Embodiment 1 of an open platform according to the present invention. As shown in FIG. 5, the open platform 50 includes: a query statement receiving module 501, a query statement sending module 502, a response message receiving module 503, and a response message sending module 504.

The query statement receiving module 501 is configured to: receive a natural language query statement sent by a user terminal, and transform the natural language query statement into a query statement that can be recognized by a third-party content provider, where the natural language query statement is generated after the user terminal receives a query request described by a user in a natural language.

The query statement sending module 502 is configured to send the query statement that can be recognized to one or more third-party content providers.

The response message receiving module 503 is configured to receive one or more query response messages returned by the one or more third-party content providers according to the query statement that can be recognized.

The response message sending module 504 is configured to send the one or more query response messages to the user terminal.

Optionally, the open platform 50 further includes an information determining module 505, configured to: before the query statement sending module 502 sends the query statement that can be recognized to the one or more third-party content providers, determine one or more third-party content providers that the user pays attention to, where the query statement sending module is specifically configured to send the query statement that can be recognized to the one or more third-party content providers that the user pays attention to.

The open platform provided in this embodiment of the present invention transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider. Further, filtering is performed on the third-party content provider based on an attention degree of a user, so that the user can voluntarily choose a third-party service provider that the user prefers. The third-party content provider may know which user pays attention to a service of the third-party content provider instead of only passively providing content. Therefore, a service provider may be prompted to improve service quality and improve user experience.

Figure 6:
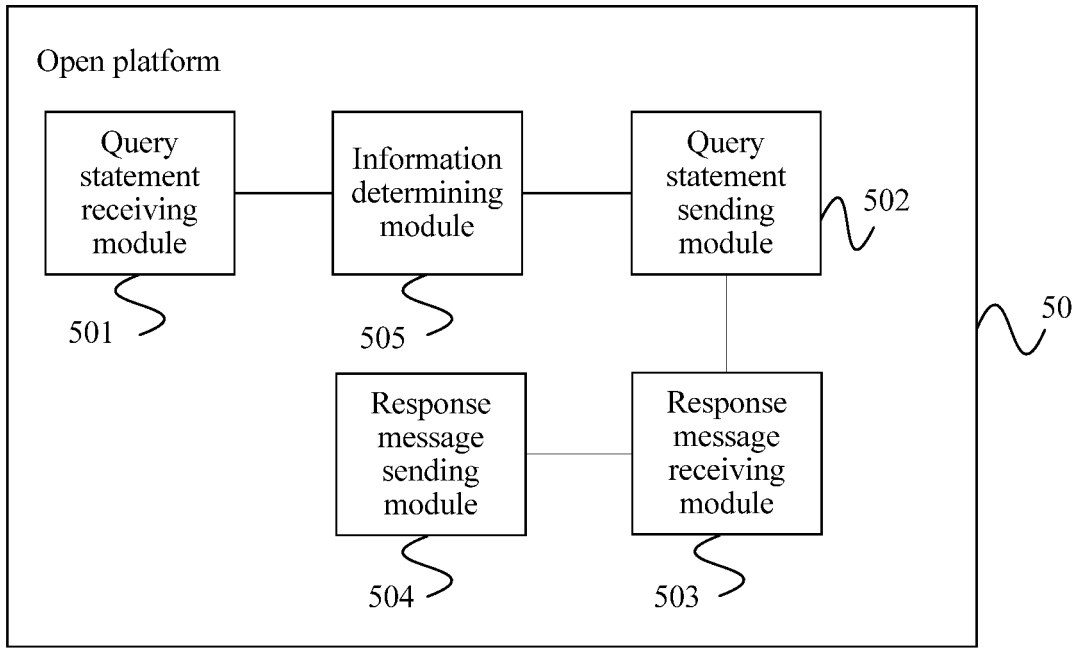
FIG. 6 is a schematic structural diagram of Embodiment 2 of an open platform according to the present invention.

FIG. 6 is a schematic structural diagram of Embodiment 2 of an open platform according to the present invention. This embodiment is implemented based on the embodiment in FIG. 5, which is specifically as follows.

Optionally, the information determining module 505 is specifically configured to:

send, to the user terminal, a first message used to indicate a third-party content provider that has successfully registered with the open platform, so that the user terminal displays, according to the first message, a list of the third-party content provider that has successfully registered with the open platform; receive a second message that is sent by the user terminal and that is used to indicate a third-party content provider that the user chooses to pay attention to; and determine, according to the second message, the one or more third-party content providers that the user pays attention to, where the second message is generated by the user terminal according to a choosing operation performed on the list of the third-party content provider by the user.

Optionally, the natural language query statement includes information about the one or more third-party content providers that the user pays attention to; and the information determining module 505 is specifically configured to:

perform semantic analysis on the natural language query statement, to determine the one or more third-party content providers that the user pays attention to.

Optionally, the query statement receiving module 501 is specifically configured to:

perform semantic analysis on the natural language query statement, to determine a third-party content provider type corresponding to the natural language query statement; and transform, according to the third-party content provider type corresponding to the natural language query statement, the natural language query statement into a query statement that can be recognized by a third-party content provider belonging to the third-party content provider type; and the query statement sending module 502 is specifically configured to:

send, to one or more third-party content providers belonging to the third-party content provider type, the query statement that can be recognized by the third-party content provider belonging to the third-party content provider type.

Optionally, the response message sending module 504 is specifically configured to: in terms of sending a query response message to the user terminal, when the response message receiving module 503 receives multiple query response messages returned by multiple third-party content providers, send the multiple query response messages to the user terminal according to a scheduling policy.

Optionally, the response message sending module 504 is specifically configured to send the multiple query response messages to the user terminal according to bidding ranks of the multiple third-party content providers.

Optionally, the response message sending module 504 is specifically configured to: determine a matching degree between a query response message returned by each of the third-party content providers and the natural language query statement; and send the multiple query response messages to the user terminal in descending order of matching degrees between the multiple query response messages and the natural language query statement; where the matching degree includes at least one of the following: a distance matching degree, a price matching degree, or a product matching degree.

The open platform provided in this embodiment of the present invention may be configured to perform the technical solution in the foregoing method embodiments. Implementation principles and technical solutions thereof are similar, and details are not described herein in this embodiment. In addition, it should be noted that, the open platform provided in FIG. 5 and in FIG. 6 is only a specific implementation manner based on an architecture of the open platform provided in FIG. 2 of the present invention. Specifically, the function of the user access module in an architecture diagram of the open platform shown in FIG. 2 is implemented by the query statement receiving module 501 and the response message sending module 504. The function of the interface module in FIG. 2 is implemented by the query statement sending module 502 and the response message receiving module 503 in the embodiments corresponding to FIG. 5 and FIG. 6. The function of the service scheduling module in FIG. 2 is implemented by the query statement receiving module 501, the query statement sending module 502, the response message sending module 504, and the information determining module 505 together in the embodiments corresponding to FIG. 5 and FIG. 6. The function of the natural language parsing module in FIG. 2 is implemented by the query statement receiving module 501 in the embodiments corresponding to FIG. 5 and FIG. 6. It can be understood that, persons skilled in the art may implement functions of the open platform in the present invention in another function division manner, which is not specially limited in this embodiment of the present invention.

The open platform provided in this embodiment of the present invention transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider. Further, filtering is performed on the third-party content provider based on an attention degree of a user, so that the user can voluntarily choose a third-party service provider that the user prefers; the third-party content provider may know which user pays attention to a service of the third-party content provider instead of only passively providing content. Therefore, a service provider may be prompted to improve service quality and improve user experience.

Figure 7:
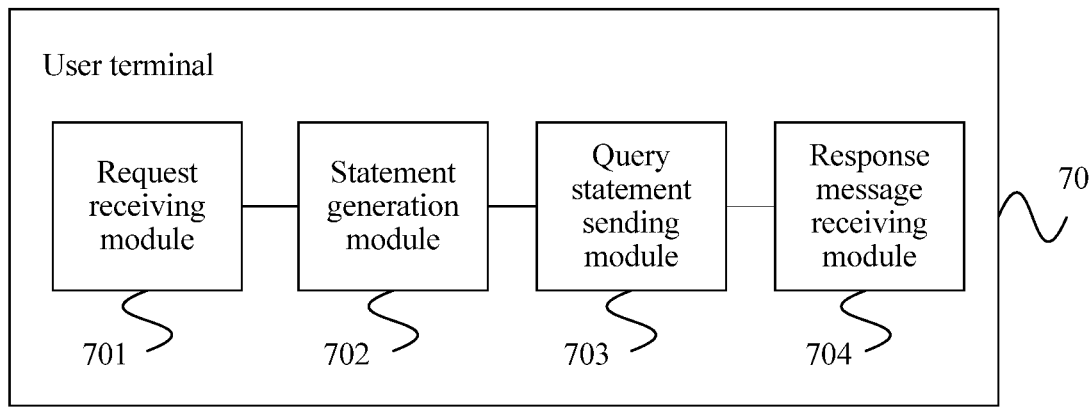
FIG. 7 is a schematic structural diagram of Embodiment 1 of a user terminal according to the present invention.

FIG. 7 is a schematic structural diagram of Embodiment 1 of a user terminal according to the present invention. As shown in FIG. 7, a user terminal 70 provided in this embodiment of the present invention includes: a request receiving module 701, a statement generation module 702, a query statement sending module 703, and a response message receiving module 704.

The request receiving module 701 is configured to receive a query request described by a user in a natural language.

The statement generation module 702 is configured to generate a natural language query statement according to the query request described by the user in the natural language.

The query statement sending module 703 is configured to send the natural language query statement to an open platform, so that the open platform transforms the natural language query statement into a query statement that can be recognized by a third-party content provider, and sends the query statement that can be recognized to one or more third-party content providers.

The response message receiving module 704 is configured to receive one or more query response messages that are returned by the one or more third-party content providers and that are sent by the open platform.

According to the user terminal provided in this embodiment of the present invention, an open platform transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider.

Figure 8:
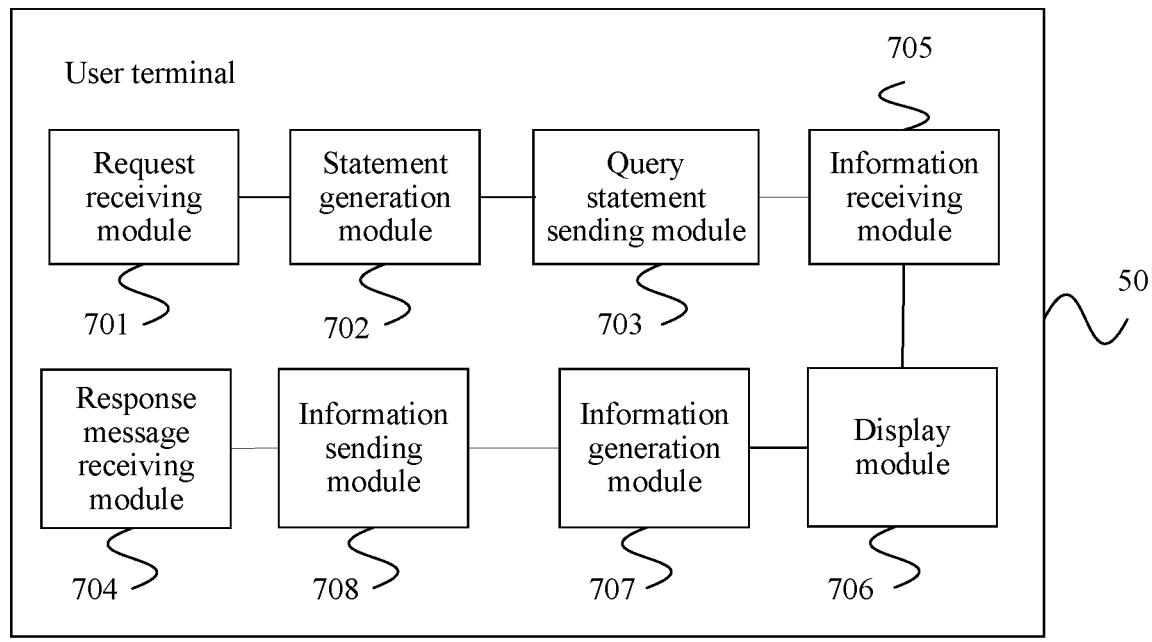
FIG. 8 is a schematic structural diagram of Embodiment 2 of a user terminal according to the present invention.

FIG. 8 is a schematic structural diagram of Embodiment 2 of a user terminal according to the present invention. As shown in FIG. 8, this embodiment is implemented based on the embodiment in FIG. 7, which is specifically as follows.

Optionally, a mobile terminal 70 provided in the present invention further includes:

an information receiving module 705, configured to: before the response message receiving module 704 receives the one or more query response messages that are returned by the one or more third-party content providers and that are sent by the open platform, receive a first message that is sent by the open platform and that is used to indicate a third-party content provider that has successfully registered with the open platform;

a display module 706, configured to display, according to the first message, a list of the third-party content provider that has successfully registered with the open platform;

an information generation module 707, configured to generate, according to a choosing operation performed on the list of the third-party content provider by the user, a second message used to indicate a third-party content provider that the user chooses to pay attention to; and an information sending module 708, configured to send the second message to the open platform, so that the open platform determines, according to the second message, the third-party content provider that the user pays attention to, and sends the query statement that can be recognized to one or more third-party content providers that the user pays attention to.

The user terminal provided in this embodiment of the present invention may be configured to perform the technical solution in the foregoing method embodiments; implementation principles and technical solutions thereof are similar, and details are not described herein in this embodiment.

According to the user terminal provided in this embodiment of the present invention, an open platform transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider.

Figure 9:
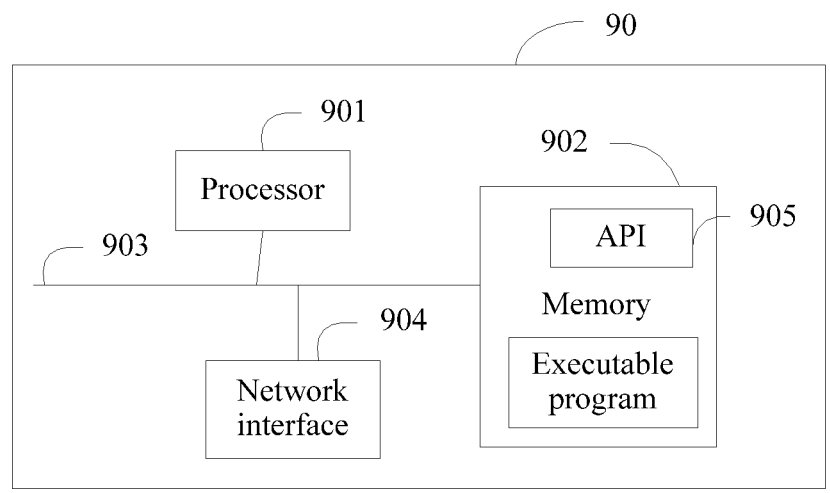
FIG. 9 is a schematic diagram of a server according to an embodiment of the present invention.

FIG. 9 is a schematic diagram of a server according to an embodiment of the present invention. The server 90 includes: a processor 901, a memory 902, a bus 903, and a network interface 904. The processor 901, the memory 902, and the network interface 904 are separately connected to the bus 903. The memory 902 stores an application programming interface (API) 905. In addition, the server 90 opens the API of the server for use by a third-party content provider, and the third-party content provider accesses the server by using a registration mechanism and provides a service for a user terminal under scheduling of the server.

The memory 902 further stores an executable program, registration information of the third-party content provider, information about a third-party content provider that a user pays attention to, and the like. The network interface 904 may be configured to perform network communicate with the user terminal and a network device of the third-party content provider.

By using the bus 903, the processor 901 invokes the executable program stored in the memory 902, and is configured to: receive, by using the network interface 904, a natural language query statement sent by the user terminal, and transform the natural language query statement into a query statement that can be recognized by the third-party content provider, where the natural language query statement is generated after the user terminal receives a query request described by the user in a natural language; send the query statement that can be recognized to one or more third-party content providers by using the network interface 904; receive, by using the network interface 904, one or more query response messages returned by the one or more third-party content providers according to the query statement that can be recognized; and send the one or more query response messages to the user terminal by using the network interface 904.

Optionally, before the processor 901 sends the query statement that can be recognized to the one or more third-party content providers by using the network interface 904, the processor 901 is further configured to determine information about one or more third-party content providers that the user pays attention to.

The processor 901 sends, by using the network interface 904, the query statement that can be recognized to the one or more third-party content providers that the user pays attention to.

Optionally, the processor 901 is specifically configured to: send, by using the network interface 904 to the user terminal, a first message used to indicate a third-party content provider that has successfully registered with the server, so that the user terminal displays, according to the first message, a list of the third-party content provider that has successfully registered with the server; and receive, by using the network interface 904, a second message that is sent by the user terminal and that is used to indicate a third-party content provider that the user chooses to pay attention to. The processor 901 is specifically configured to determine, according to the second message, the one or more third-party content providers that the user pays attention to, where the second message is generated by the user terminal according to a choosing operation performed on the list of the third-party content provider by the user.

Optionally, the natural language query statement includes the one or more third-party content providers that the user pays attention to. The processor 901 is specifically configured to perform semantic analysis on the natural language query statement, to determine the one or more third-party content providers that the user pays attention to.

Optionally, the processor 901 is specifically configured to: perform semantic analysis on the natural language query statement, to determine a third-party content provider type corresponding to the natural language query statement; and transform, according to the third-party content provider type corresponding to the natural language query statement, the natural language query statement into a query statement that can be recognized by a third-party content provider belonging to the third-party content provider type.

The processor 901 is specifically configured to send, by using the network interface 904 to one or more third-party content providers belonging to the third-party content provider type, the query statement that can be recognized by the third-party content provider belonging to the third-party content provider type.

Optionally, the processor 901 is further configured to: when multiple query response messages returned by multiple third-party content providers are received by using the network interface 904, send the multiple query response messages to the user terminal according to a scheduling policy.

Optionally, the processor 901 is specifically configured to send the multiple query response messages to the user terminal according to bidding ranks of the multiple third-party content providers.

Optionally, the processor 901 is specifically configured to: determine a matching degree between a query response message returned by each of the third-party content providers and the natural language query statement, and send the multiple query response messages to the user terminal in descending order of matching degrees between the multiple query response messages and the natural language query statement; where the matching degree includes at least one of the following: a distance matching degree, a price matching degree, or a product matching degree.

The server provided in this embodiment of the present invention may be configured to perform the technical solution in the foregoing method embodiments. Implementation principles and technical solutions thereof are similar, and details are not described herein in this embodiment.

The server provided in this embodiment of the present invention transforms a natural language query statement into a query statement that can be recognized by a third-party content provider, and the third-party content provider does not need to have a natural language processing capability; an interface may be directly provided for the third-party content provider to perform integration, which reduces an access difficulty in accessing an open platform by the third-party content provider. Further, filtering is performed on the third-party content provider based on an attention degree of a user, so that the user can voluntarily choose a third-party service provider that the user prefers; the third-party content provider may know which user pays attention to a service of the third-party content provider instead of only passively providing content. Therefore, a service provider may be prompted to improve service quality and improve user experience.

Figure 10:
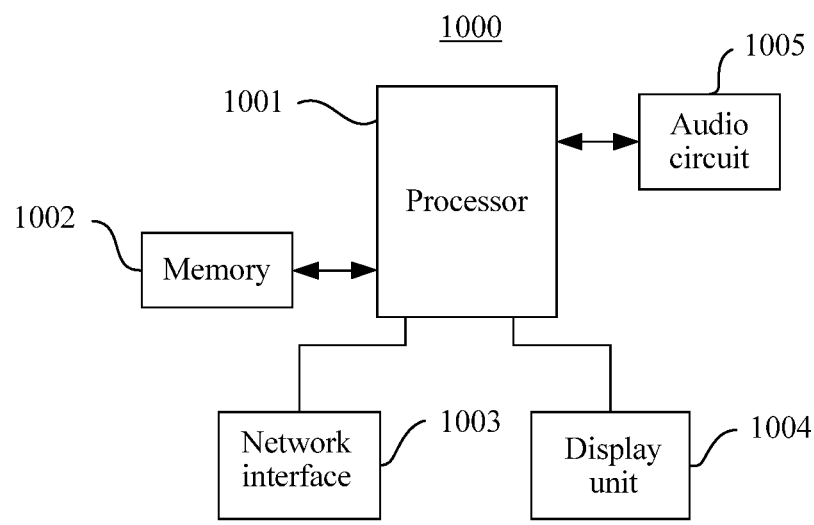
FIG. 10 is a schematic structural diagram of Embodiment 3 of a user terminal according to the present invention.

FIG. 10 is a schematic structural diagram of Embodiment 3 of a user terminal according to the present invention. As shown in FIG. 10, a user terminal 1000 provided in this embodiment of the present invention includes: a processor 1001, a memory 1002, a network interface 1003, a display unit 1004, and an audio circuit 1005.

The memory 1002 may be configured to store a software program and a module. The processor 1001 performs various function applications of the user terminal 1000 and data processing by running the software program and the module that are stored in the memory 1002.

The network interface 1003 includes a function of receiving data and transmitting data, and can perform network communication with an open platform.

The display unit 1004 may be configured to display information input by a user, information provided for a user, or the like.

The audio circuit 1005 converts a received audio signal into audio data, and outputs the audio data to the processor 1001.

In this embodiment of the present invention, the processor 1001 included in the user terminal has the following functions:

receiving, by using the network interface 1003, a query request described by a user in a natural language;

generating a natural language query statement according to the query request described by the user in the natural language;

sending the natural language query statement to the open platform by using the network interface 1003, so that the open platform transforms the natural language query statement into a query statement that can be recognized by a third-party content provider, and sends the query statement that can be recognized to one or more third-party content providers; and receiving, by using the network interface 1003, one or more query response messages that are returned by the one or more third-party content providers and that are sent by the open platform.

Optionally, before the processor 1001 receives, by using the network interface 1003, the one or more query response messages that are returned by the one or more third-party content providers and that are sent by the open platform, the processor is further configured to receive, by using the network interface 1003, a first message that is sent by the open platform and that is used to indicate a third-party content provider that has successfully registered with the open platform.

The processor 1001 displays, according to the first message by using the display unit 1004, a list of the third-party content provider that has successfully registered with the open platform.

The processor 1001 generates, according to a third-party content provider that the user pays attention to and that is determined by the user, information about the third-party content provider that the user pays attention to.

The processor 1001 sends the second message to the open platform by using the network interface 1003, so that the open platform determines, according to the second message, the third-party content provider that the user pays attention to, and sends the query statement that can be recognized to one or more third-party content providers that the user pays attention to.

According to the user terminal provided in this embodiment of the present invention, an open platform transforms a natural language query statement into a query statement that can be recognized by a third-party content provider, and the third-party content provider does not need to have a natural language processing capability; an interface may be directly opened for the third-party content provider to perform integration, which reduces an access difficulty in accessing the open platform by the third-party content provider.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data query method supporting a natural language, the method comprising:

receiving, by an open platform, a natural language query statement sent by a user terminal, and transforming the natural language query statement into a query statement that is recognizable by a third-party content provider, wherein the natural language query statement is generated after the user terminal receives a query request described by a user in the natural language;

sending, by the open platform, the query statement that is recognizable to one or more third-party content providers;

receiving, by the open platform, one or more query response messages returned by the one or more third-party content providers according to the query statement that is recognizable; and sending, by the open platform, the one or more query response messages to the user terminal, wherein when the open platform receives multiple query response messages returned by multiple third-party content providers, sending, by the open platform, the multiple query response messages to the user terminal comprises:

sending, by the open platform, the multiple query response messages to the user terminal according to bidding ranks of the multiple third-party content providers; or determining, by the open platform, a matching degree between a query response message returned by each of the third-party content providers and the natural language query statement; and sending, by the open platform, the multiple query response messages to the user terminal in descending order of the matching degree between the multiple query response messages and the natural language query statement, wherein the matching degree comprises at least one of the following: a distance matching degree, a price matching degree, or a product matching degree.

2. The method according to claim 1, wherein the one or more third-party content providers are third-party content providers that successfully register with the open platform.

3. The method according to claim 1, wherein before sending the query statement, the method further comprises:

determining, by the open platform, one or more third-party content providers that the user pays attention to; and the sending, by the open platform, the query statement that is recognizable to one or more third-party content providers comprises:

sending, by the open platform, the query statement that is recognizable to the one or more third-party content providers that the user pays attention to.

4. The method according to claim 3, wherein determining the one or more third-party content providers that the user pays attention to comprises:

sending, by the open platform to the user terminal, a first message used to indicate a third-party content provider that has successfully registered with the open platform, wherein the user terminal displays, according to the first message, a list of the third-party content provider that has successfully registered with the open platform;

receiving a second message that is sent by the user terminal and that is used to indicate a third-party content provider that the user chooses to pay attention to; and determining, according to the second message, the one or more third-party content providers that the user pays attention to, wherein the second message is generated by the user terminal according to a choosing operation performed on the list of the third-party content provider by the user.

5. The method according to claim 3, wherein the natural language query statement comprises the one or more third-party content providers that the user pays attention to, and the determining, by the open platform, one or more third-party content providers that the user pays attention to comprises:

performing, by the open platform, semantic analysis on the natural language query statement, to determine the one or more third-party content providers that the user pays attention to.

6. The method according to claim 1, wherein transforming the natural language query statement comprises:

performing, by the open platform, semantic analysis on the natural language query statement, to determine a third-party content provider type corresponding to the natural language query statement; and transforming, by the open platform according to the third-party content provider type corresponding to the natural language query statement, the natural language query statement into a query statement that is recognizable by a third-party content provider belonging to the third-party content provider type; and the sending, by the open platform, the query statement that is recognizable to one or more third-party content providers comprises:

sending, by the open platform to one or more third-party content providers belonging to the third-party content provider type, the query statement that is recognizable by the third-party content provider belonging to the third-party content provider type.

7. The method according to claim 1, wherein sending the multiple query response messages to the user terminal comprises:

sending, by the open platform, the multiple query response messages to the user terminal according to bidding ranks of the multiple third-party content providers, wherein sending the multiple query response messages to the user terminal does not comprise determining the matching degree and sending the multiple query response messages to the user terminal in descending order of matching degrees between the multiple query response messages and the natural language query statement.

8. The method according to claim 1, wherein sending the multiple query response messages to the user terminal comprises:

determining, by the open platform, a matching degree between a query response message returned by each of the third-party content providers and the natural language query statement; and sending, by the open platform, the multiple query response messages to the user terminal in descending order of matching degrees between the multiple query response messages and the natural language query statement, wherein the matching degree comprises at least one of the following: a distance matching degree, a price matching degree, or a product matching degree, wherein sending the multiple query response messages to the user terminal does not comprise sending the multiple query response messages to the user terminal according to the bidding ranks of the multiple third-party content providers.

9. A data query method supporting a natural language, the method comprising:

receiving, by a user terminal, a query request described by a user in the natural language;

generating, by the user terminal, a natural language query statement according to the query request described by the user in the natural language;

sending, by the user terminal, the natural language query statement to an open platform, wherein the open platform transforms the natural language query statement into a query statement that is recognizable by a third-party content provider, and sends the query statement that is recognizable to one or more third-party content providers; and receiving, by the user terminal, one or more query response messages that are returned by the one or more third-party content providers and that are sent by the open platform, wherein when the user terminal receives multiple query response messages returned by multiple third-party content providers and that are sent by the open platform, the multiple query response messages are sent to the user terminal by the open platform according to bidding ranks of the multiple third-party content providers; or the multiple query response messages are sent to the user terminal by the open platform in descending order of a matching degree between the multiple query response messages and the natural language query statement, wherein the matching degree comprises at least one of the following: a distance matching degree, a price matching degree, or a product matching degree.

10. The method according to claim 9, wherein before receiving the one or more query response messages, the method further comprising:

receiving, by the user terminal, a first message that is sent by the open platform and that is used to indicate a third-party content provider that has successfully registered with the open platform;

displaying, by the user terminal according to the first message, a list of the third-party content provider that has successfully registered with the open platform;

generating, by the user terminal according to a choosing operation performed on the list of the third-party content provider by the user, a second message used to indicate a third-party content provider that the user chooses to pay attention to; and sending, by the user terminal, the second message to the open platform, wherein the open platform determines, according to the second message, the third-party content provider that the user pays attention to, and sends the query statement that is recognizable to one or more third-party content providers that the user pays attention to.

11. An open platform comprising:

a processor;

a memory storing a program to be executed in the processor, the program comprising a plurality of modules of instructions, the plurality of modules comprising:

a query statement receiving module configured to:
  receive a natural language query statement sent by a user terminal, and
  transform the natural language query statement into a query statement that is recognizable by a third-party content provider, wherein the natural language query statement is generated after the user terminal receives a query request described by a user in a natural language;
a query statement sending module configured to send the query statement that is recognizable to one or more third-party content providers;
a response message receiving module configured to receive one or more query response messages returned by the one or more third-party content providers according to the query statement that is recognizable; and
a response message sending module configured to send the one or more query response messages to the user terminal, wherein when the response message receiving module receives multiple query response messages returned by multiple third-party content providers, the response message sending module is configured to:
  send the multiple query response messages to the user terminal according to bidding ranks of the multiple third-party content providers; or
  determine a matching degree between a query response message returned by each of the third-party content providers and the natural language query statement; and send the multiple query response messages to the user terminal in descending order of the matching degree between the multiple query response messages and the natural language query statement, wherein the matching degree comprises at least one of the following: a distance matching degree, a price matching degree, or a product matching degree.

12. The open platform according to claim 11, wherein the plurality of modules further comprise an information determining module configured to: before the query statement sending module sends the query statement that is recognizable to the one or more third-party content providers, determine one or more third-party content providers that the user pays attention to, wherein
  the query statement sending module is configured to send the query statement that is recognizable to the one or more third-party content providers that the user pays attention to.

13. The open platform according to claim 12, wherein the information determining module is configured to:
  send, to the user terminal, a first message used to indicate a third-party content provider that has successfully registered with the open platform, so that the user terminal displays, according to the first message, a list of the third-party content provider that has successfully registered with the open platform; receive a second message that is sent by the user terminal and that is used to indicate a third-party content provider that the user chooses to pay attention to; and determine, according to the second message, the one or more third-party content providers that the user pays attention to, wherein the second message is generated by the user terminal according to a choosing operation performed on the list of the third-party content provider by the user.

14. The open platform according to claim 12, wherein the natural language query statement comprises information about the one or more third-party content providers that the user pays attention to, and the information determining module is configured to:
  perform semantic analysis on the natural language query statement, to determine the one or more third-party content providers that the user pays attention to.

15. The open platform according to claim 11, wherein the query statement receiving module is configured to:
  perform semantic analysis on the natural language query statement, to determine a third-party content provider type corresponding to the natural language query statement; and
  transform, according to the third-party content provider type corresponding to the natural language query statement, the natural language query statement into a query statement that is recognizable by a third-party content provider belonging to the third-party content provider type; and
  the query statement sending module is configured to:
    send, to one or more third-party content providers belonging to the third-party content provider type, the query statement that is recognizable by the third-party content provider belonging to the third-party content provider type.

16. The open platform according to claim 11, wherein the response message sending module is configured to send the multiple query response messages to the user terminal according to bidding ranks of the multiple third-party content providers, without determining the matching degree and sending the multiple query response messages to the user terminal in descending order of matching degrees between the multiple query response messages and the natural language query statement.

17. The open platform according to claim 11, wherein the response message sending module is configured to:
  determine a matching degree between a query response message returned by each of the third-party content providers and the natural language query statement; and
  send, by the open platform, the multiple query response messages to the user terminal in descending order of matching degrees between the multiple query response messages and the natural language query statement, wherein the matching degree comprises at least one of the following: a distance matching degree, a price matching degree, or a product matching degree, without sending the multiple query response messages to the user terminal according to the bidding ranks of the multiple third-party content providers.

18. A user terminal comprising:
  a processor;
  a memory storing a program to be executed in the processor, the program comprising a plurality of modules of instructions, the plurality of modules comprising:
    a request receiving module configured to receive a query request described by a user in a natural language;
    a statement generation module configured to generate a natural language query statement according to the query request described by the user in the natural language;
    a query statement sending module configured to send the natural language query statement to an open platform, wherein the open platform transforms the natural language query statement into a query statement that is recognizable by a third-party content provider, and sends the query statement that is recognizable to the one or more third-party content providers; and
a response message receiving module configured to receive one or more query response messages that are returned by the one or more third-party content providers and that are sent by the open platform, wherein when the response message receiving module receives multiple query response messages returned by multiple third-party content providers and that are sent by the open platform, the multiple query response messages are sent to the user terminal by the open platform according to bidding ranks of the multiple third-party content Providers; or the multiple query response messages are sent to the user terminal by the open platform in descending order of a matching degree between the multiple query response messages and the natural language query statement, wherein the matching degree comprises at least one of the following: a distance matching degree, a price matching degree, or a product matching degree.

19. The user terminal according to claim 18, further comprising:

an information receiving module configured to: before the response message receiving module receives the one or more query response messages that are returned by the one or more third-party content providers and that are sent by the open platform, receive a first message that is sent by the open platform and that is used to indicate a third-party content provider that has successfully registered with the open platform;
a display module configured to display, according to the first message, a list of the third-party content provider that has successfully registered with the open platform;
an information generation module configured to generate, according to a choosing operation performed on the list of the third-party content provider by the user, a second message used to indicate a third-party content provider that the user chooses to pay attention to; and
an information sending module configured to send the second message to the open platform, wherein the open platform determines, according to the second message, the third-party content provider that the user pays attention to, and sends the query statement that is recognizable to one or more third-party content providers that the user pays attention to.

* * * * *